US012611786B2

(12) United States Patent
Öberg et al.

(10) Patent No.: US 12,611,786 B2
(45) Date of Patent: Apr. 28, 2026

(54) SEALING ARRANGEMENT, INDUSTRIAL ROBOT AND METHOD

(71) Applicant: ABB Schweiz AG, Baden (CH)

(72) Inventors: Åke Öberg, Uppsala (SE); Shanghua Li, Västerås (SE); Jiangwei Huang, Västerås (SE)

(73) Assignee: ABB Schweiz AG, Baden (CH)

( * ) Notice: Subject to any disclaimer, the term of this patent is extended or adjusted under 35 U.S.C. 154(b) by 454 days.

(21) Appl. No.: 16/766,686

(22) PCT Filed: Jan. 11, 2018

(86) PCT No.: PCT/EP2018/050606
§ 371 (c)(1),
(2) Date: May 24, 2020

(87) PCT Pub. No.: WO2019/137605
PCT Pub. Date: Jul. 18, 2019

(65) Prior Publication Data
US 2020/0368921 A1 Nov. 26, 2020

(51) Int. Cl.
B25J 19/00 (2006.01)
B25J 9/00 (2006.01)
(Continued)

(52) U.S. Cl.
CPC ......... B25J 19/0075 (2013.01); B25J 9/0012 (2013.01); B25J 17/00 (2013.01); F16J 15/064 (2013.01); F16J 15/16 (2013.01)

(58) Field of Classification Search
CPC .... B25J 19/0075; B25J 9/126; B25J 17/0241; B25J 17/00; B25J 11/0045; B25J 9/04; B25J 9/06; B25J 18/00; F16J 15/3236
See application file for complete search history.

(56) References Cited

U.S. PATENT DOCUMENTS 3,726,433 A 4/1973 Andrews
4,740,358 A 4/1988 Lind
(Continued)

FOREIGN PATENT DOCUMENTS

DE 4134680 A1 4/1993
DE 4033331 A1 * 4/1994 .......... B25J 19/0029
(Continued)

OTHER PUBLICATIONS

Wikipedia contributors. (Jan. 4, 2018). Ultraviolet. In Wikipedia, The Free Encyclopedia. Retrieved 13:43, Jun. 10, 2022, from https://en.wikipedia.org/w/index.php?title=Ultraviolet&oldid= 818648225 (Year: 2018).*
(Continued)

*Primary Examiner* — Joseph Brown
(74) *Attorney, Agent, or Firm* — Whitmyer IP Group LLC

(57) ABSTRACT

Sealing arrangement including a sealing element arranged to seal a gap between a proximal member and a distal member, the sealing element including a sealing material configured to withstand a temperature of at least 100° C.; and a heating element arranged to heat the sealing material to at least 70° C. An industrial robot including at least one sealing arrangement and a method for sterilizing a sealing element are also provided.

20 Claims, 5 Drawing Sheets

(51) Int. Cl.
　　　*B25J 17/00*　　　(2006.01)
　　　*F16J 15/06*　　　(2006.01)
　　　*F16J 15/16*　　　(2006.01)

(56)　　　　　　　　References Cited

U.S. PATENT DOCUMENTS

| | | | |
|---|---|---|---|
| 7,878,088 B2 * | 2/2011 | Tamura | B25J 19/0075 |
| | | | 74/490.05 |
| 8,740,881 B2 | 6/2014 | Ortmaier et al. | |
| 2008/0216453 A1 | 9/2008 | Giesen | |
| 2017/0239810 A1 * | 8/2017 | Bordegnoni | B25J 9/044 |
| 2018/0281208 A1 * | 10/2018 | Fauteux | H02K 21/22 |

FOREIGN PATENT DOCUMENTS

| | | | |
|---|---|---|---|
| GB | 2451700 A | 2/2009 | |
| JP | 2011185326 A | 9/2011 | |
| WO | 3803548 A1 | 5/1988 | |

OTHER PUBLICATIONS

DE 4134680 A1 (Rudolph Krapf) Apr. 22, 1993 (Description). [online] [retrieved on Jun. 10, 2022]. [retrieved from ProQuest Dialog]. (Year: 1993).*

International Preliminary Report on Patentability Application No. PCT/EP2018/050606 Issued: Jul. 14, 2020 7 pages.

International Search Report and Written Opinion of the International Searching Authority Application No. PCT/EP2018/050606 Completed: Sep. 5, 2018; Mailing Date: Sep. 19, 2018 11 pages.

Chinese Office Action; Application No. 201880084328.2; Issues Sep. 5, 2022; 13 Pages.

Chinese Second Office Action; Application No. 201880084328.2; Issued: Dec. 6, 2022; 14 Pages.

\* cited by examiner

SEALING ARRANGEMENT, INDUSTRIAL ROBOT AND METHOD

TECHNICAL FIELD

The present disclosure generally relates to sealing arrangements. In particular, a sealing arrangement comprising a sealing element, an industrial robot comprising at least one sealing arrangement and a method for sterilizing a sealing element, are provided.

BACKGROUND

In processing environments where for example food products or pharmaceuticals are handled, it is desirable to maintain a certain level of hygiene. Comprehensive cleaning procedures are often required for apparatuses, such as industrial robots, operating in such hygienic environments. Typical cleaning procedures include high pressure washing and the use of strong acidic and alkaline detergents and disinfectants. However, even after thorough and systematic cleaning, there is a risk that pathogenic microorganisms remain in interfaces between parts.

U.S. Pat. No. 8,740,881 B2 discloses a sterile barrier for a surgical robot comprising at least one joint with two opposing joint members that rotate relative to one another about a common joint axis and a torque sensor. The torque sensor comprises at least two sterile barrier sections each with an end section for sealed attachment to a respective joint end section of the joint member; and a sealing arrangement for producing a sterile and sealed rotating connection of the end sections of the at least two sterile barrier sections.

DE 4134680 A1 discloses a seal unit having an elastic sealing body with a heating system. A coil spring, bent into a C- or O-shape, preferably acts as the heater, with the ends as the electrical connections. An insulating layer is applied to the spring or the spring is encapsulated directly in a C-shaped shrouding. A C-shaped metal mantle is applied to give the outer covering to complete the sealing body.

WO 8803548 A1 discloses an elastic sealing strip including a cross-linked thermoplastics element deformed from its memorized shape, such that when it is fitted in place it can be caused to strive towards its memorized shape by heating it to the fusion interval of the cross-linked thermoplastics material.

SUMMARY

One object of the present disclosure is to provide a sealing arrangement having an improved hygiene.

A more particular object of the present disclosure is to provide a sealing arrangement that effectively prevents growth of microorganisms on and/or in a sealing element.

A further object of the present disclosure is to provide a sealing arrangement having a simple and/or cheap design.

A still further object of the present disclosure is to provide a sealing arrangement that provides an effective and durable sealing of a gap, e.g. that prevents ingress of fluids and other substances through the gap.

A still further object of the present disclosure is to provide a sealing arrangement solving several or all of the foregoing objects.

A still further object of the present disclosure is to provide an industrial robot comprising a sealing arrangement that solves one, several or all of the foregoing objects.

A still further object of the present disclosure is to provide a method for sterilizing a sealing element that solves one, several or all of the foregoing objects.

According to one aspect, there is provided a sealing arrangement comprising a sealing element arranged to seal a gap between a proximal member and a distal member, the sealing element comprising a sealing material configured to withstand a temperature of at least 100° C.; and a heating element arranged to heat the sealing material to at least 70° C. By heating the sealing material to at least 70° C., the sealing arrangement provides for an enhanced local disinfection of the sealing element and secures a sanitary seal.

Above 70° C., most harmful bacteria are killed in a relatively short time. The heating element may however be arranged to heat the sealing material to at least 80° C., such as to at least 90° C., such as to at least 100° C. The sealing arrangement according to the present disclosure may be referred to as a self-sterilizing seal. A sealing element configured to withstand or resist heat at a temperature of at least 100° C. may be constituted by a sealing element in which no, or substantially no, thermal cracks are generated at this temperature. When the heating element is not activated, the operation temperature of the sealing element may be below 100° C.

The sealing element may be constituted by a dynamic sealing element arranged to seal a gap between a proximal member and a distal member movable relative to each other. The sealing element may be arranged to seal a gap between a proximal member and a distal member rotatable relative to each other about a rotational axis. Alternatively, the sealing element may be arranged to seal a gap between a proximal member and a distal member arranged to translate relative to each other along a translational axis.

The sealing element according to the present disclosure may alternatively be used as a stationary seal. That is, the sealing element may be used to seal a gap between a proximal member and a distal member that are stationary with respect to each other. In this case, the proximal member and the distal member may be fixed stationary relative to each other but do not need to be stationary in space.

The heating element may be arranged radially inside a radially outer surface of the sealing element with respect to the rotational axis. In case the proximal member and the distal member are rotatable relative to each other, the radially outer surface (e.g. a circular surface) may be flush, or substantially flush, with a radially outer surface of the proximal member and/or a radially outer surface of the distal member. Thereby, a joint having a smooth exterior profile can be provided between the proximal member and the distal member.

The heating element may be at least partly enclosed by the sealing element. The heating element for example may be integrated or embedded in the sealing element.

According to one example where the proximal member and the distal member are rotatable relative to each other about a rotational axis, the sealing element comprises a radially outer section with respect to the rotational axis, a proximal section and a distal section. In this case, the heating element may be arranged next to the radially outer section between the proximal section and the distal section.

According to a further example where the proximal member and the distal member are rotatable relative to each other about a rotational axis, the sealing element comprises a radially outer section with respect to the rotational axis, a radially inner section with respect to the rotational axis, a proximal section and a distal section. In this case, the heating element may be arranged between the radially outer section and the radially inner section, and between the proximal section and the distal section. Furthermore, in this example, the sealing element may comprise an opening, e.g. in the proximal section or in the distal section, for guiding a heating element cable to the heating element.

According to one example where the proximal member and the distal member are translationally movable relative to each other along a translational axis, the sealing element comprises a radially outer section with respect to the translational axis, a radially inner section with respect to the translational axis, and a distal section. In this case, the heating element may be arranged next to (i.e. radially inside) the distal section and between the radially outer section and the radially inner section.

According to a further example where the proximal member and the distal member are translationally movable relative to each other along a translational axis, the sealing element comprises a radially outer section with respect to the translational axis, a radially inner section with respect to the translational axis, a proximal section and a distal section. In this case, the heating element may be arranged between the radially outer section and the radially inner section, and between the proximal section and the distal section. Furthermore, in this example, the sealing element may comprise an opening, e.g. in the proximal section or in the distal section, for guiding a heating element cable to the heating element.

Alternatively, the heating element may be arranged adjacent to the sealing element. Thus, the heating element may be arranged outside the sealing element, e.g. proximal, distal or radially inside of the sealing element with respect to a rotational axis of the distal member relative to the proximal member or proximal, distal, radially inside or radially outside of the sealing element with respect to a translational axis of the distal member relative to the proximal member, but still sufficiently close to the heating element in order to heat the same to at least 70° C.

The heating element may be constituted by an electric heating element. The heating element may thus be arranged to heat the sealing material by means of ohmic heating.

Alternatively, the heating element may be constituted by an ultraviolet light source. According to one variant, the sealing arrangement comprises both an electric heating element and an ultraviolet light source according to the present disclosure.

The temperature of the sealing element can readily be measured by monitoring the electric current passing through the electric heating element or to the ultraviolet light source. The sterilizing function of the sealing arrangement can also readily be changed by providing a different current control. The sterilizing function of the sealing arrangement can also readily be controlled by monitoring the applied current. For this control, account may also be taken of the frictional heating of the sealing element due to relative movement of the proximal member and the distal member.

The sealing material may comprise, or may be constituted by, a polymeric material. Suitable polymeric materials include, for example, polytetrafluoroethylene (PTFE), ultra high molecular weight polyethylene, and elastomers. PTFE has a maximum operating temperature of above 200° C., which is far above the lethal temperature of most pathogen microorganisms. The sealing element according to the present disclosure may be circular, or substantially circular.

According to a further aspect, there is provided an industrial robot comprising at least one sealing arrangement according to the present disclosure. The industrial robot may be of various types. Examples of industrial robots according to the present disclosure include robots with a manipulator having at least three degrees of freedom, such as six or seven degrees of freedom, parallel robots such as the FlexPicker® by ABB, and collaborative dual-arm robots, such as the YuMi® by ABB.

The sealing element of the at least one sealing arrangement may be arranged to seal at least one joint of the industrial robot. A joint may be regarded as the part of a manipulator permitting either rotational or translational motion. Each joint provides a single degree of freedom.

The industrial robot may comprise a plurality of sealing arrangements according to the present disclosure for sealing a plurality of joints of the industrial robot. Other gaps in the industrial robot, such as gaps between a stationary proximal member and a stationary distal member, may also be sealed by the sealing element (i.e. a stationary sealing element). The industrial robot may be hermetically sealed by means of one or more sealing elements according to the present disclosure.

The industrial robot may comprise a proximal member; a distal member; a driving mechanism configured to actuate a movement of the distal member relative to the proximal member; and a power bus configured to power the driving mechanism, the power bus being guided through the interior of the proximal member; wherein the heating element is powered via the power bus. At least the proximal member may define a passage therein for allowing the power bus, and optional further cables and conduits, to pass through. Each of the proximal member and the distal member of the industrial robot may comprise a circular exterior profile.

The heating element may be constituted by an ultraviolet light source and the ultraviolet light source may be fixedly connected relative to (i.e. directly or indirectly) the proximal member or relative to (i.e. directly or indirectly) the distal member. The ultraviolet light source may for example be fixedly connected to the exterior of the proximal member or to the exterior of the distal member. The ultraviolet light source may be detachably connected to the proximal member or to the distal member, e.g. by a magnetic connection.

According to a further aspect, there is provided a method for sterilizing a sealing element, the method comprising providing a sealing element arranged to seal a gap between a proximal member and a distal member, the sealing element comprising a sealing material configured to withstand a temperature of at least 100° C.; and heating the sealing material to at least 70° C. The method may be carried out with any type of sealing arrangement according to the present disclosure. The method may further comprise arranging a heating element to be at least partly enclosed by the sealing element; and wherein the heating of the sealing material to at least 70° C. is carried out by means of the heating element.

Throughout the present disclosure, the proximal member and the distal member may equally be referred to as a first member and a second member, respectively. Correspondingly, a proximal direction and a distal direction may equally be referred to as a first direction and a second direction, respectively, throughout the present disclosure.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
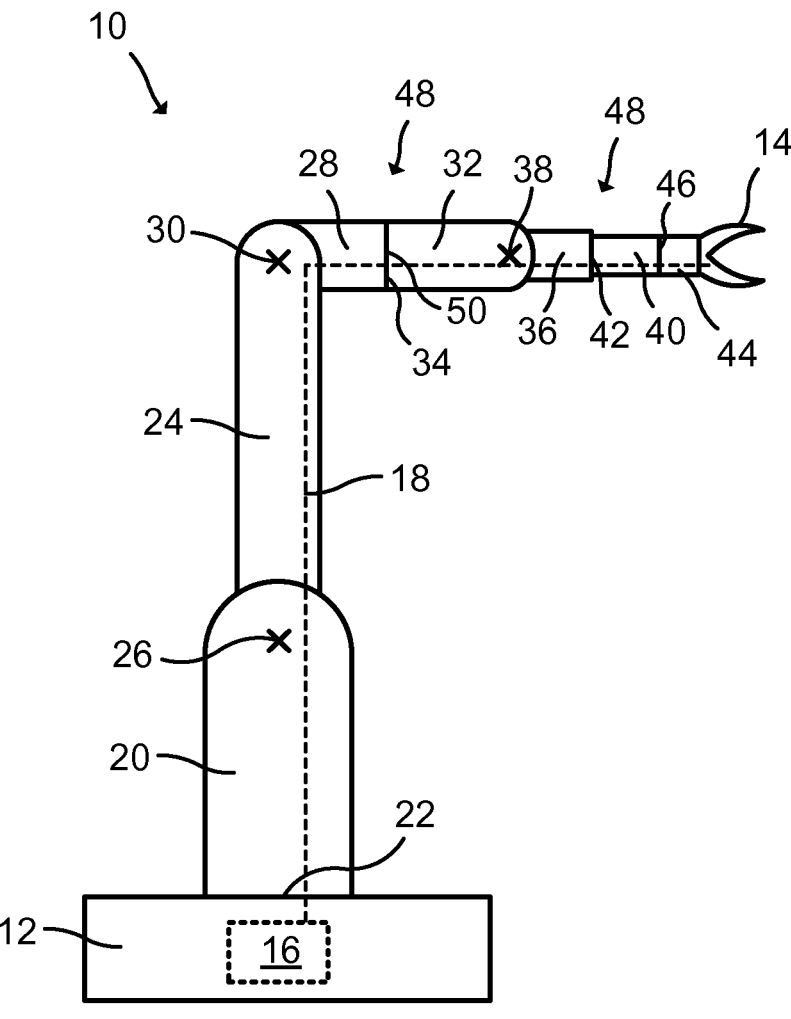
FIG. 1: schematically represents a side view of an industrial robot comprising two sealing arrangements.

In the following, a sealing arrangement comprising a sealing element, an industrial robot comprising at least one sealing arrangement and a method for sterilizing a sealing element, will be described. The same reference numerals will be used to denote the same or similar structural features.

FIG. 1 schematically represents a side view of an industrial robot 10. The industrial robot 10 is exemplified as a seven-axis industrial robot but the present disclosure is not limited to this type of robot.

The industrial robot 10 comprises a base member 12, a tool 14, a control system 16, such as a robot controller, and a power bus 18. The industrial robot 10 of this example further comprises a first link member 20 distal of the base member 12 and rotatable relative to the base member 12 at a first joint 22, a second link member 24 distal of the first link member 20 and rotatable relative to the first link member 20 at a second joint 26, a third link member 28 distal of the second link member 24 and rotatable relative to the second link member 24 at a third joint 30, a fourth link member 32 distal of the third link member 28 and rotatable relative to the third link member 28 at a fourth joint 34, a fifth link member 36 distal of the fourth link member 32 and rotatable relative to the fourth link member 32 at a fifth joint 38, a sixth link member 40 distal of the fifth link member 36 and translationally movable relative to the fifth link member 36 at a sixth joint 42, and a seventh link member 44 distal of the sixth link member 40 and rotatable relative to the sixth link member 40 at a seventh joint 46. The seventh link member 44 comprises an interface (not denoted) to which the tool 14 is attached.

The industrial robot 10 further comprises at least one sealing arrangement 48 comprising a sealing element 50 according to the present disclosure. In FIG. 1, one sealing arrangement 48 is indicated at the fourth joint 34 between the third link member 28 and the fourth link member 32, and one sealing arrangement 48 is indicated at the sixth joint 42 between the fifth link member 36 and the sixth link member 40. However, sealing arrangements 48 according to the present disclosure may be provided for only one joint, one or more additional joints or all joints.

Figure 2:
FIG. 2: schematically represents a partial cross sectional view of a joint of the industrial robot in FIG. 1 and of one example of a sealing arrangement.
Figure 2:
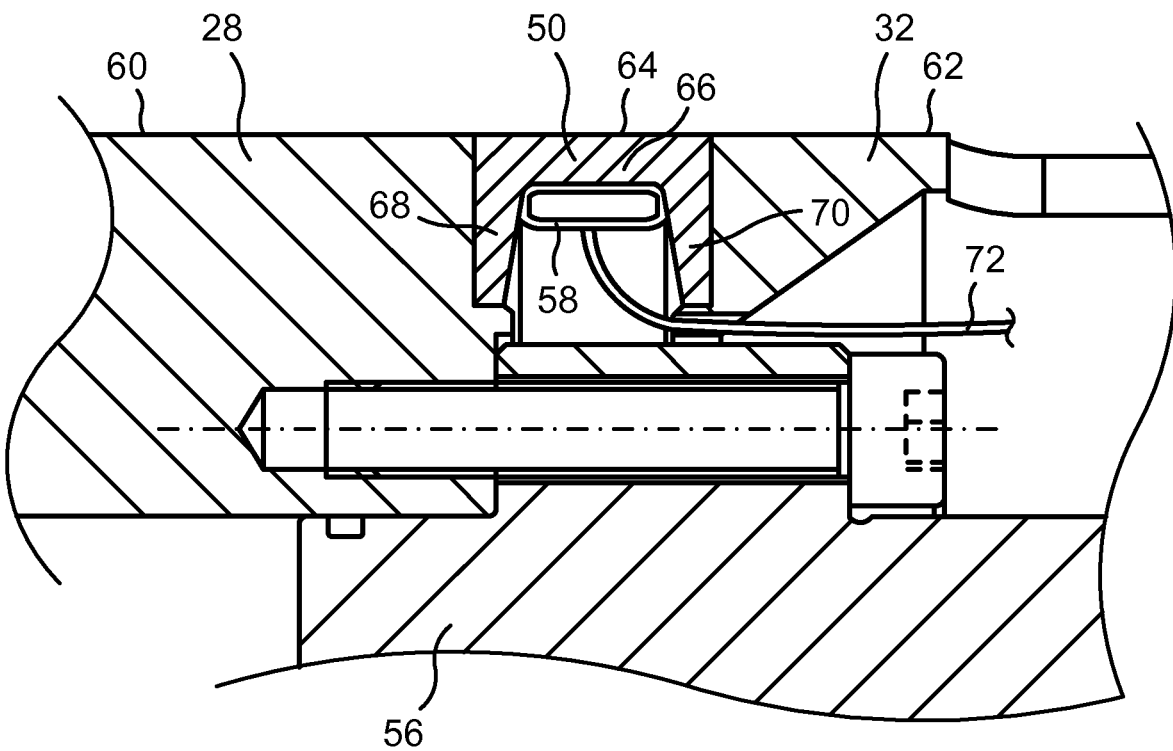
Figure 2:

FIG. 2 schematically represents a partial cross-sectional view of the fourth joint 34 of the industrial robot 10 in FIG. 1 and of one example of a sealing arrangement 48. In the example of FIG. 2, the third link member 28 constitutes a proximal member according to the present disclosure since it is arranged proximal of the fourth link member 32, and the fourth link member 32 constitutes a distal member according to the present disclosure since it is arranged distal of the third link member 28.

The distal member 32 is movable relative to the proximal member 28. In the example of FIG. 2, the distal member 32 can rotate relative to the proximal member 28 in a rotational direction 52 about a rotational axis 54.

FIG. 2 further shows that the industrial robot 10 comprises a driving mechanism 56. The driving mechanism 56 is configured to actuate the rotation of the distal member 32 relative to the proximal member 28. The driving mechanism 56 may comprise, or may be constituted by, a gearbox.

The sealing element 50 of the sealing arrangement 48 in FIG. 2 is configured to seal a gap between the proximal member 28 and the distal member 32. Since the sealing element 50 is configured to seal the gap between two relatively movable components, the sealing element 50 constitutes a dynamic seal. The sealing arrangement 48 according to the present disclosure may also be employed for static seals, i.e. seals between two components that are stationary relative to each other.

The sealing element 50 in FIG. 2 comprises a sealing material configured to withstand a temperature of at least 100° C., such as a PTFE material. Thus, the sealing material can withstand a temperature of at least 100° C. without failure.

The sealing arrangement 48 in FIG. 2 further comprises an electrical heating element 58, here constituted by electric wiring for ohmic heating. The heating element 58 is arranged to heat the sealing material of the sealing element 50 to at least 70° C., such as to at least 90° C., in order to sterilize the sealing element 50.

The proximal member 28 comprises a circular exterior surface 60 and the distal member 32 comprises a circular exterior surface 62. The sealing element 50 of this example is constituted by a circular ring and comprises an outer surface 64 that is substantially flush with the exterior surface 60 of the proximal member 28 and with the exterior surface 62 of the distal member 32.

The sealing element 50 comprises a radially outer section 66, with respect to the rotational axis 54. The heating element 58 is arranged radially inside the radially outer section 66 of the sealing element 50. The sealing element 50 further comprises a proximal section 68 and a distal section 70. Thus, the sealing element 50 of this example has a generally U-shaped cross sectional profile. The heating element 58 is arranged between the proximal section 68 and the distal section 70 of the sealing element 50. The heating element 58 is thereby integrated in the sealing element 50.

The sealing element 50 may be fixed to the distal member 32 and a sliding interface may be established between the proximal section 68 and the proximal member 28. However, the sealing element 50 may alternatively be arranged fixed with respect to the proximal member 28.

The sealing element 50 of this example is opened radially inwards and a heating element cable 72 for providing current to the heating element 58 is guided through the opening to the heating element 58. The heating element cable 72 is provided with current via the power bus 18 guided through the interior of the proximal member 28.

Figure 3:
FIG. 3: schematically represents a partial cross sectional view of the joint and of an alternative example of a sealing arrangement.
Figure 3:
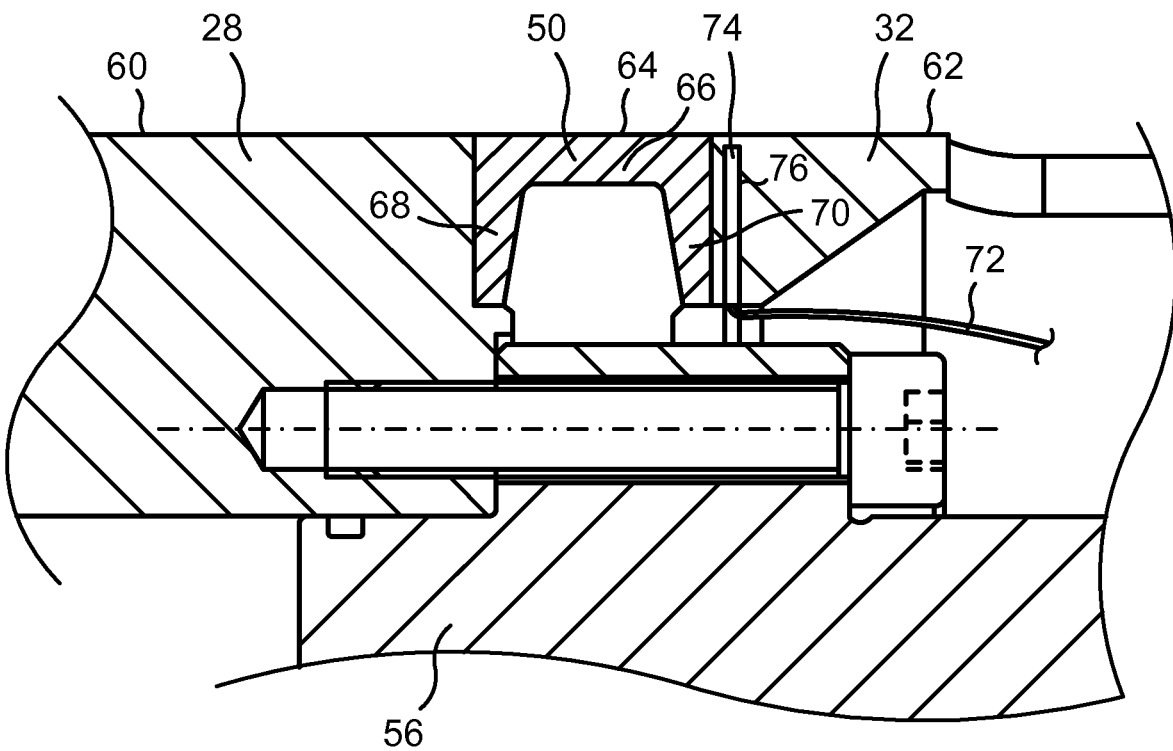
Figure 3:

FIG. 3 schematically represents a partial cross sectional view of the fourth joint 34 and of an alternative example of a sealing arrangement 48. Mainly differences with respect to FIG. 2 will be described.

The sealing arrangement 48 in FIG. 3 comprises a heating element 74 arranged adjacent to the sealing element 50. Also in this example, the heating element 74 is constituted by an electrical heating element 74. The heating element 74 is arranged in an annular groove 76 in the distal member 32 and provides ohmic heating. In FIG. 3, the sealing element 50 is provided with the same U-shaped cross sectional profile as in FIG. 2. However, the sealing element 50 according to the example in FIG. 3 may alternatively have a rectangular cross sectional profile. In other words, the radially inwardly facing opening of the sealing element 50 may be omitted.

Figure 4:
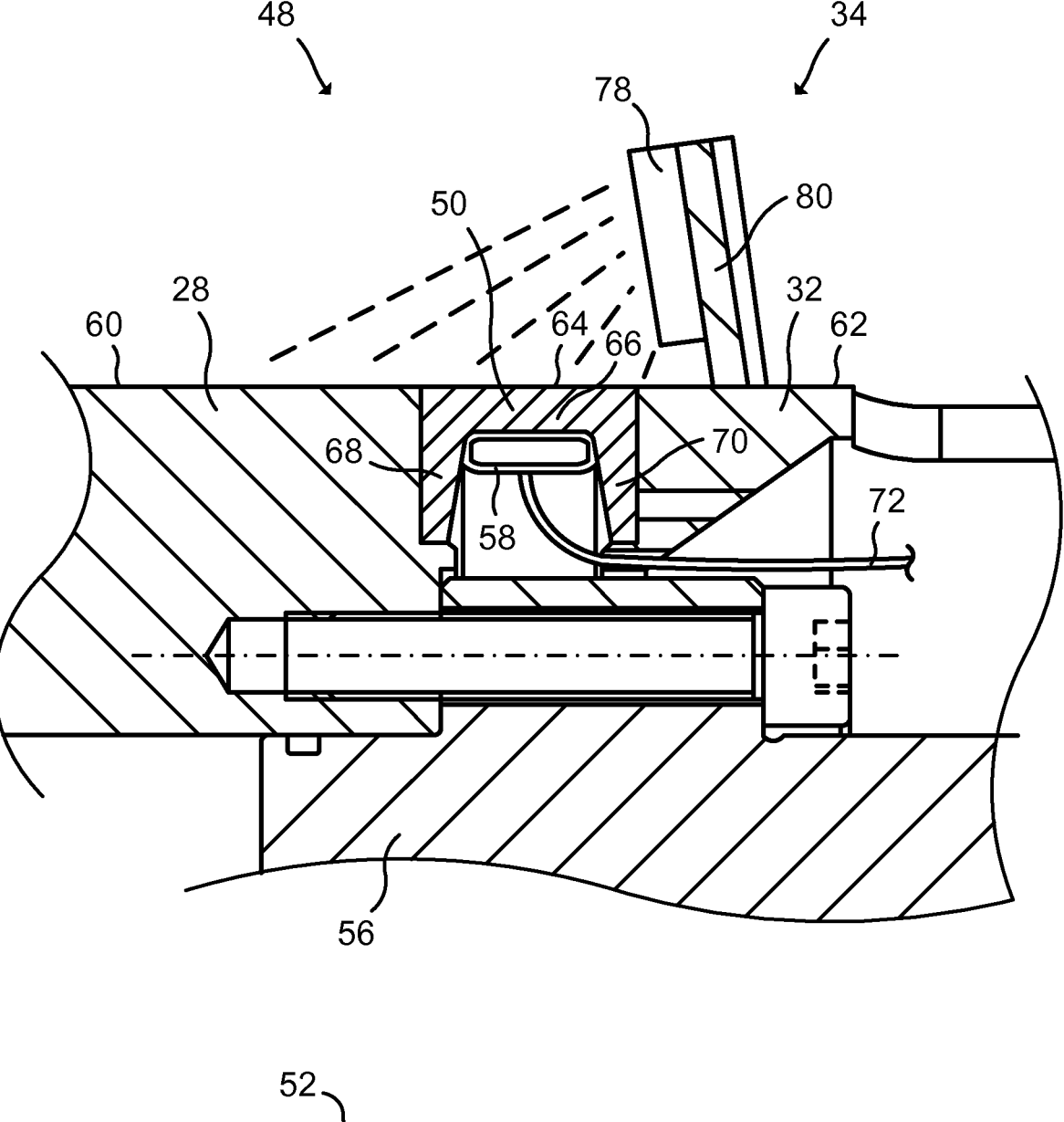
FIG. 4: schematically represents a partial cross sectional view of the joint and of a further alternative example of a sealing arrangement.

FIG. 4 schematically represents a partial cross sectional view of the fourth joint 34 and of a further alternative example of a sealing arrangement 48. Mainly differences with respect to FIGS. 2 and 3 will be described.

The sealing arrangement 48 comprises a heating element 78 arranged to heat the sealing material to at least 70° C., such as to at least 90° C. In the example of FIG. 4, the heating element 78 is constituted by an ultraviolet light source 78. The ultraviolet light source 78 is arranged to emit light on the sealing element 50 such that the sealing material of the sealing element 50 is heated to at least 70° C.

In FIG. 4, the ultraviolet light source 78 is connected to an arm part 80 which in turn is fixedly connected to the distal member 32. By rotating the distal member 32 about the rotational axis 54, the sealing element 50 can be "scanned" with ultraviolet light around its entire circumference until the sealing material reaches a temperature of at least 70° C.

The ultraviolet light source 78 in this example is detachably attached to the arm part 80 by a magnetic connection. However, the ultraviolet light source 78 may alternatively be detachably attached to the exterior surface 62 of the distal member 32 by a magnetic connection. As a further alternative, the ultraviolet light source 78 may be permanently connected or detachably connected to the exterior or the interior of the proximal member 28 or the distal member 32. The ultraviolet light source 78 may be powered by an internal battery (not shown) or via the power bus 18.

As shown in FIG. 4, the sealing arrangement 48 also comprises the electric heating element 58 according to FIG. 2. However, the electric heating element 58 may be omitted in the example of FIG. 4. Thus, the sealing material of the sealing element 50 can be heated to at least 70° C. by means of the ultraviolet light source 78 alone.

Figure 5:
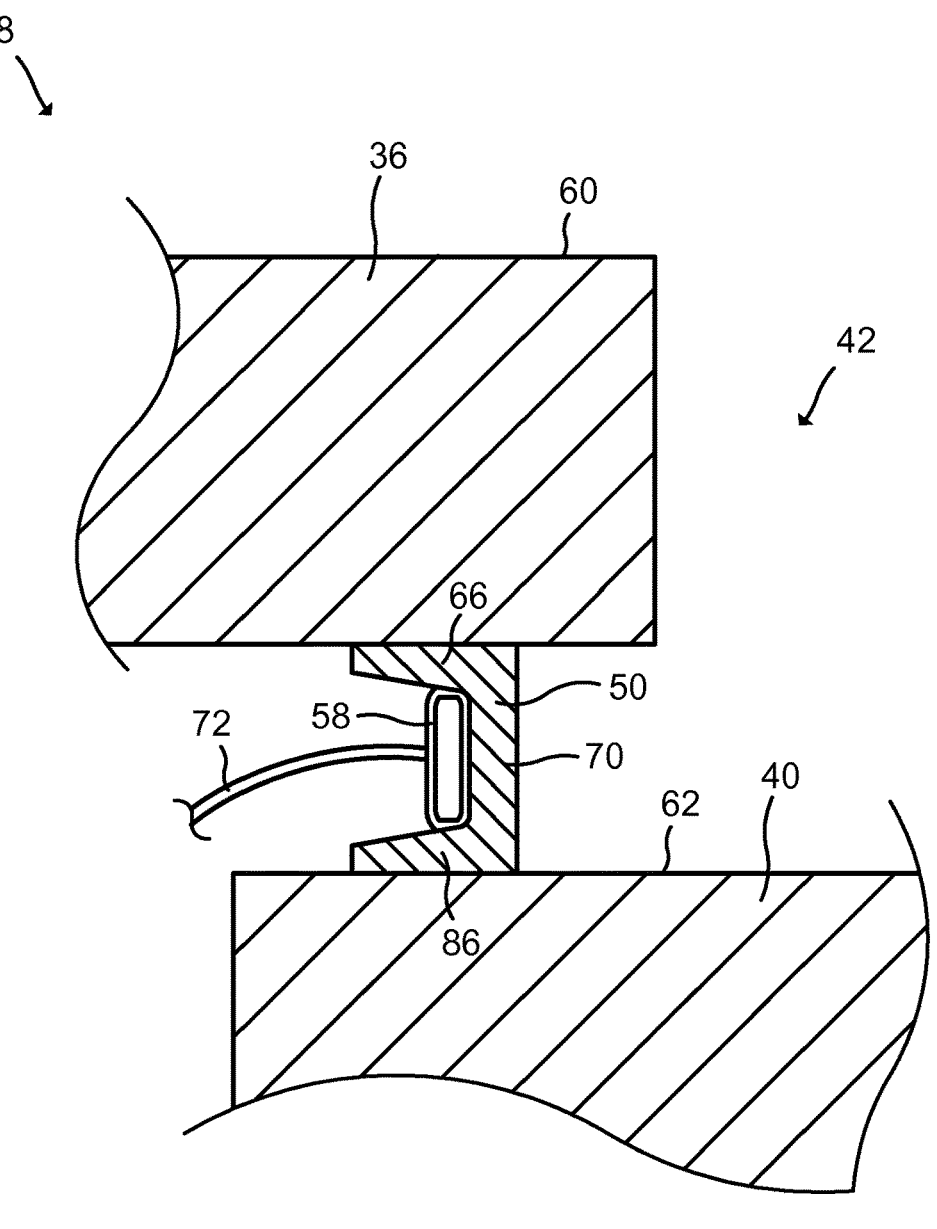
FIG. 5: schematically represents a partial cross sectional view of a further joint of the industrial robot in FIG. 1 and of one example of a sealing arrangement.
Figure 5:
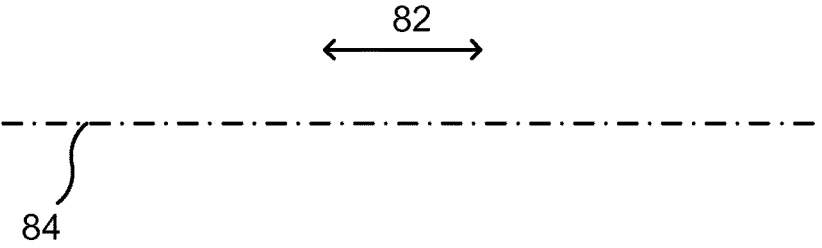

FIG. 5 schematically represents a partial cross sectional view of the sixth joint 42 of the industrial robot 10 in FIG. 1 and of one example of a sealing arrangement 48. In FIG. 5, the sealing arrangement 48 is of the same type as in FIG. 2, i.e. the sealing arrangement 48 comprises a sealing element 50 and an electric heating element 58 integrated in the sealing element 50.

The fifth link member 36 constitutes a proximal member according to the present disclosure since it is arranged proximal of the sixth link member 40 and the sixth link member 40 constitutes a distal member according to the present disclosure since it is arranged distal of the fifth link member 36. The distal member 40 is movable relative to the proximal member 36. More specifically, the distal member 40 can translate relative to the proximal member 36 in a translational direction 82 along a translational axis 84.

The sealing element 50 comprises a radially outer section 66 and a radially inner section 86 and the heating element 58 is arranged between the radially outer section 66 and the radially inner section 86. The sealing element 50 may be fixed to the proximal member 36 and a sliding interface may be established between the radially inner section 86 and the exterior surface 62 of the distal member 40. However, the sealing element 50 may alternatively be arranged fixed with respect to the distal member 40.

The sealing element 50 is closed in a distal direction by means of the distal section 70. The sealing element 50 comprises a proximal opening through which the heating element cable 72 is guided from the power bus 18 to the heating element 58.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. An industrial robot comprising at least one sealing arrangement, wherein the sealing arrangement comprises:
   a sealing element arranged to seal a gap between a proximal member and a distal member, the sealing element having an outer surface that is flush with an outer surface of the proximal member and an outer surface of the distal member, the sealing element including a sealing material configured to withstand a temperature of at least 100° C.; and
   a heating element arranged to heat the sealing material to at least 70° C.

2. The industrial robot according to claim 1, wherein the sealing element is constituted by a dynamic sealing element arranged to seal the gap between the proximal member and the distal member movable relative to each other.

3. The industrial robot according to claim 2, wherein the sealing element is arranged to seal the gap between the proximal member and the distal member rotatable relative to each other about a rotational axis.

4. The industrial robot according to claim 3, wherein the heating element is arranged radially inside a radially outer surface of the sealing element with respect to the rotational axis.

5. The industrial robot according to claim 1, wherein the heating element is at least partly enclosed by the sealing element.

6. The industrial robot according to claim 1, wherein the heating element is arranged adjacent to the sealing element.

7. The industrial robot according to claim 1, wherein the heating element is constituted by an electric heating element.

8. The industrial robot according to claim 1, wherein the heating element is constituted by an ultraviolet light source.

9. The industrial robot according to claim 1, wherein the sealing material comprises, or is constituted by, a polymeric material.

10. The industrial robot according to claim 1, wherein the sealing element of the at least one sealing arrangement is arranged to seal at least one joint of the industrial robot.

11. The industrial robot according to claim 1, wherein the industrial robot comprises:
   the proximal member;
   the distal member;
   a driving mechanism configured to actuate a movement of the distal member relative to the proximal member; and
   a power bus configured to power the driving mechanism, the power bus being guided through an interior of the proximal member;
   wherein the heating element is powered via the power bus.

12. The industrial robot according to claim 11, wherein the heating element is constituted by an ultraviolet light source and wherein the ultraviolet light source is fixedly connected relative to the proximal member or relative to the distal member.

13. A method for sterilizing a sealing element of an industrial robot, the method comprising:
   providing the industrial robot;

providing the sealing element arranged to seal a gap between a proximal member and a distal member of the industrial robot, the sealing element having an outer surface that is flush with an outer surface of the proximal member and an outer surface of the distal member, the sealing element including a sealing material configured to withstand a temperature of at least 100° C.; and heating the sealing material to at least 70° C.

14. The method according to claim 13, wherein the method further comprises arranging a heating element to be at least partly enclosed by the sealing element; and wherein the heating of the sealing material to at least 70° C. is carried out by means of the heating element.

15. The industrial robot according to claim 2, wherein the heating element is at least partly enclosed by the sealing element.

16. The industrial robot according to claim 2, wherein the heating element is arranged adjacent to the sealing element.

17. The industrial robot according to claim 2, wherein the heating element is constituted by an electric heating element.

18. The industrial robot according to claim 2, wherein the heating element is constituted by an ultraviolet light source.

19. The industrial robot according to claim 1, wherein each of the outer surface of the sealing element, the outer surface of the proximal member, and the outer surface of the distal member is a radially outer surface; and wherein the proximal member and the distal member are rotatable relative to each other.

20. The industrial robot according to claim 1, wherein the industrial robot is hermetically sealed by the sealing element.

* * * * *